United States Patent
Bartfai-Walcott et al.

(10) Patent No.: US 8,429,659 B2
(45) Date of Patent: Apr. 23, 2013

(54) SCHEDULING JOBS WITHIN A CLOUD COMPUTING ENVIRONMENT

(75) Inventors: Katalin K. Bartfai-Walcott, El Dorado Hills, CA (US); Gregory J. Boss, Saginaw, MI (US); Christopher J. Dawson, Arlington, VA (US); Rick A. Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 12/907,094

(22) Filed: Oct. 19, 2010

(65) Prior Publication Data
US 2012/0096470 A1    Apr. 19, 2012

(51) Int. Cl.
*G06F 9/46* (2006.01)

(52) U.S. Cl.
USPC .......................................................... 718/103

(58) Field of Classification Search .............. 718/1, 100, 718/103
See application file for complete search history.

(56) References Cited

U.S. PATENT DOCUMENTS

| | | | |
|---|---|---|---|
| 6,542,593 B1* | 4/2003 | Bowman-Amuah | 379/201.03 |
| 6,556,659 B1* | 4/2003 | Bowman-Amuah | 379/9.04 |
| 6,880,002 B2 | 4/2005 | Hirschfeld et al. | |
| 6,917,979 B1* | 7/2005 | Dutra et al. | 709/229 |
| 6,954,931 B2 | 10/2005 | Shetty et al. | |
| 7,275,037 B2* | 9/2007 | Lauer | 705/348 |
| 7,797,406 B2* | 9/2010 | Patel et al. | 709/220 |
| 2006/0235664 A1 | 10/2006 | Vinberg et al. | |
| 2008/0080396 A1 | 4/2008 | Meijer et al. | |
| 2009/0185212 A1* | 7/2009 | Gustafson et al. | 358/1.15 |
| 2009/0300210 A1 | 12/2009 | Ferris | |
| 2010/0042720 A1 | 2/2010 | Stienhans et al. | |
| 2010/0050172 A1 | 2/2010 | Ferris | |
| 2010/0076856 A1 | 3/2010 | Mullins | |
| 2010/0153482 A1 | 6/2010 | Kim et al. | |
| 2010/0198972 A1 | 8/2010 | Umbehocker | |
| 2010/0332401 A1* | 12/2010 | Prahlad et al. | 705/80 |
| 2011/0153824 A1* | 6/2011 | Chikando et al. | 709/226 |
| 2011/0161973 A1* | 6/2011 | Klots et al. | 718/104 |
| 2011/0173038 A1* | 7/2011 | Moon et al. | 705/7.12 |
| 2011/0173626 A1* | 7/2011 | Chi et al. | 718/103 |
| 2011/0255125 A1* | 10/2011 | Gnanasambandam et al. | 358/1.15 |

OTHER PUBLICATIONS

Mell et al., "The NIST Definition of Cloud Computing", National Institute of Standards and Technology, Information Technology Laboratory, Version 15, Oct. 7, 2009, 2 pages.

* cited by examiner

*Primary Examiner* — Van Nguyen
(74) *Attorney, Agent, or Firm* — William E. Schiesser; Keohane & D'Alessandro, PLLC

(57) ABSTRACT

Embodiments of the present invention provide an approach to prioritize jobs (e.g., within a cloud computing environment) so as to maximize positive financial impacts (or to minimize negative financial impacts) for cloud service providers, while not exceeding processing capacity or failing to meet terms of applicable Service Level Agreements (SLAs). Specifically, under the present invention a respective income (i.e., a cost to the customer), a processing need, and set of SLA terms (e.g., predetermined priorities, time constraints, etc.) will be determined for each of a plurality of jobs to be performed. The jobs will then be prioritized in a way that: maximizes cumulative/collective income; stays within the total processing capacity of the cloud computing environment; and meets the SLA terms.

20 Claims, 6 Drawing Sheets

SCHEDULING JOBS WITHIN A CLOUD COMPUTING ENVIRONMENT

TECHNICAL FIELD

The present invention generally relates to job prioritization. Specifically, the present invention relates to the prioritization of jobs within a cloud computing environment based on income, processing needs, and Service Level Agreement (SLA) terms.

BACKGROUND

The cloud computing environment is an enhancement to the predecessor grid environment, whereby multiple grids and other computation resources may be further abstracted by a cloud layer, thus making disparate devices appear to an end-user as a single pool of seamless resources. These resources may include such things as physical or logical compute engines, servers and devices, device memory, storage devices.

Presently, computing resource allocation is accomplished in a variety of ways, including "harvested capacity." Specifically, jobs in the cloud computing environment are performed based on their predetermined priority. Under such a methodology, a job performance algorithm such as the following would likely be implemented:

(a) first fulfill the needs of the highest priority job;
(b) then fulfill the needs of the second-highest priority job;
(c) then fulfill the needs of the third-highest priority job;
(d) and so forth, until all job needs are satisfied for a given period of time.

Such an algorithm, however, fails to consider many factors such as processing needs and income. Moreover, each job is looked at in isolation without giving consideration to job package as a whole. Accordingly, existing approaches can be inefficient and lack income effectiveness.

SUMMARY

Embodiments of the present invention provide an approach to prioritize jobs (e.g., within a cloud computing environment) so as to maximize positive financial impacts (or to minimize negative financial impacts) for cloud service providers, while not exceeding processing capacity or failing to meet terms of applicable Service Level Agreements (SLAs). Specifically, under the present invention a respective income (i.e., a cost to the customer), a processing need, and set of SLA terms (e.g., predetermined priorities, time constraints, etc.) will be determined for each of a plurality of jobs to be performed. The jobs will then be prioritized in a way that: maximizes cumulative/collective income; stays within the total processing capacity of the cloud computing environment; and meets the SLA terms.

A first aspect of the present invention provides a method for prioritizing jobs within a cloud computing environment, comprising: determining a processing capacity of the cloud computing environment; determining an income, a processing need, a set of service level agreement (SLA) terms for each of a plurality of jobs; and prioritizing the plurality of jobs based on their respective income, processing need, and SLA terms, wherein the prioritizing ensures that the set of SLA terms are met while maximizing the income and without exceeding the processing capacity.

A second aspect of the present invention provides a system for prioritizing jobs within a cloud computing environment, comprising: a bus; a processor coupled to the bus; and a memory medium coupled to the bus, the memory medium comprising instructions to: determine a processing capacity of the cloud computing environment; determine an income, a processing need, a set of service level agreement (SLA) terms for each of a plurality of jobs; and prioritize the plurality of jobs based on their respective income, processing need, and SLA terms, wherein the prioritizing ensures that the set of SLA terms are met while maximizing the income and without exceeding the processing capacity.

A third aspect of the present invention provides a computer program product for prioritizing jobs within a cloud computing environment, the computer program product comprising a computer readable storage media, and program instructions stored on the computer readable storage media, to: determine a processing capacity of the cloud computing environment; determine an income, a processing need, a set of service level agreement (SLA) terms for each of a plurality of jobs; and prioritize the plurality of jobs based on their respective income, processing need, and SLA terms, wherein the prioritizing ensures that the set of SLA terms are met while maximizing the income and without exceeding the processing capacity.

A fourth aspect of the present invention provides a method for deploying a system for prioritizing jobs within a cloud computing environment, comprising: deploying a computer infrastructure being operable to: determine a processing capacity of the cloud computing environment; determine an income, a processing need, a set of service level agreement (SLA) terms for each of a plurality of jobs; and prioritize the plurality of jobs based on their respective income, processing need, and SLA terms, wherein the prioritizing ensures that the set of SLA terms are met while maximizing the income and without exceeding the processing capacity.

BRIEF DESCRIPTION OF THE DRAWINGS

These and other features of this invention will be more readily understood from the following detailed description of the various aspects of the invention taken in conjunction with the accompanying drawings in which.

Figure 1:
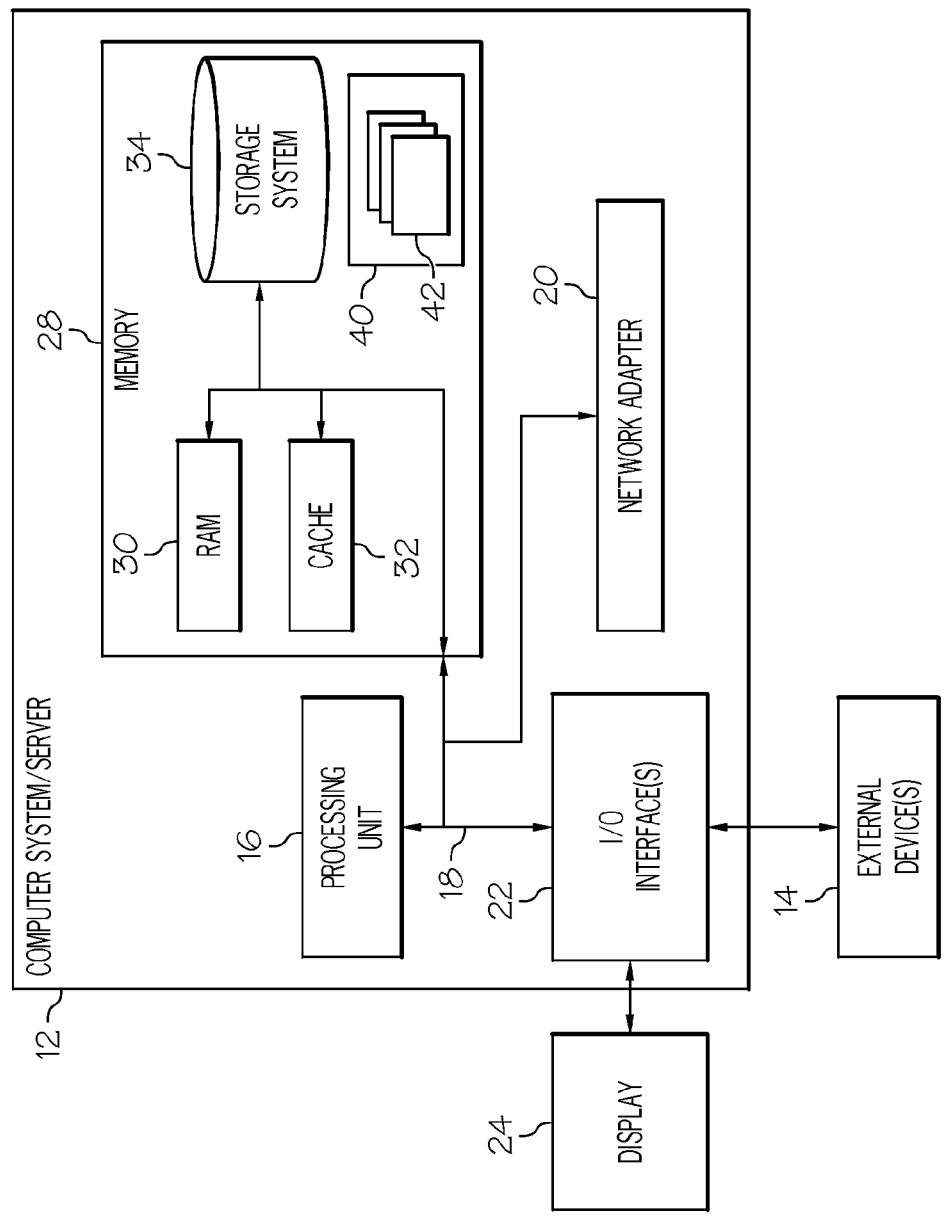
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach to prioritize jobs (e.g., within a cloud computing environment) so as to maximize positive financial impacts (or to minimize negative financial impacts) for cloud service providers, while not exceeding processing capacity or failing to meet terms of applicable Service Level Agreements (SLAs). Specifically, under the present invention a respective income (e.g., a cost to the customer), a processing need, and set of SLA terms (e.g., predetermined priorities, time constraints, etc.) will be determined for each of a plurality of jobs to be performed. The jobs will then be prioritized in a way that: maximizes cumulative/collective income; stays within the total processing capacity of the cloud computing environment; and meets the SLA terms.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Job priority program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
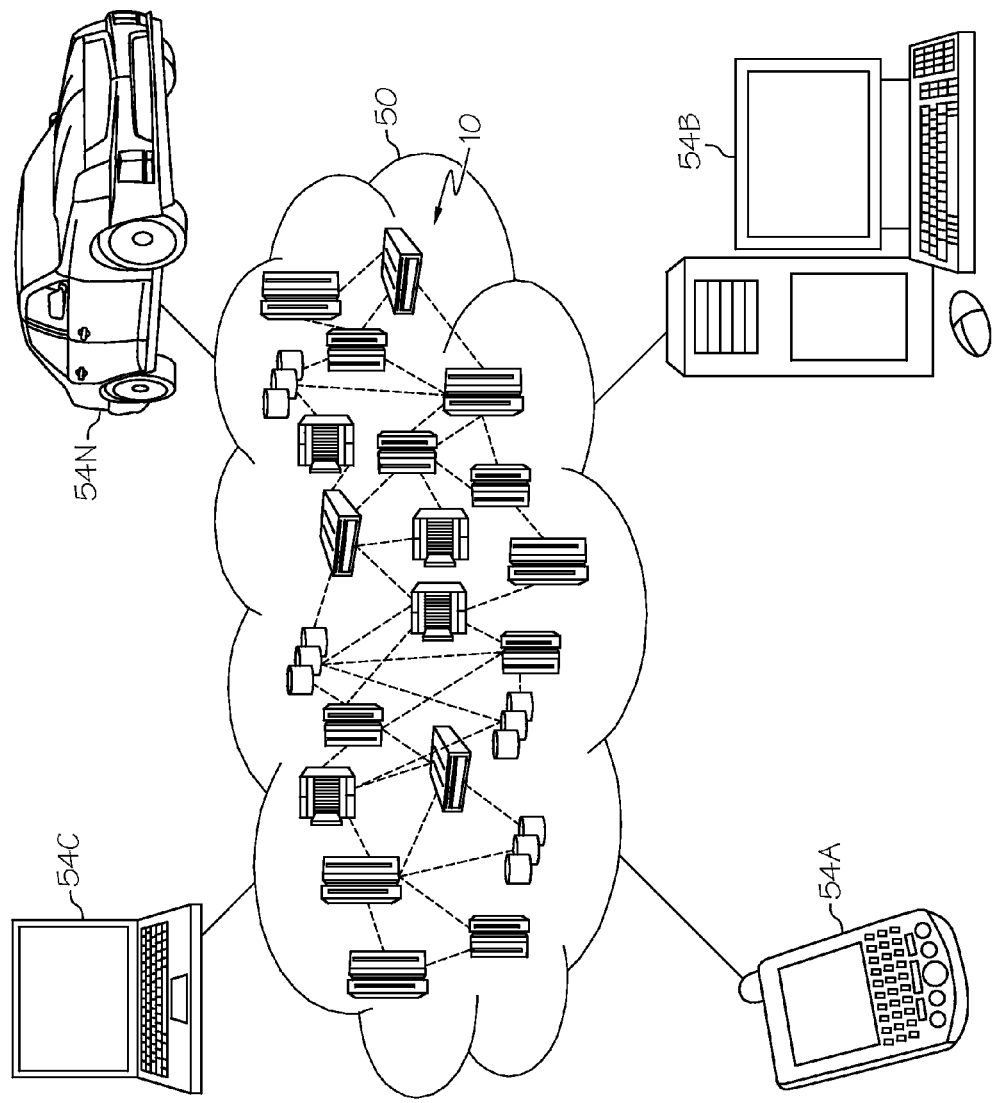
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
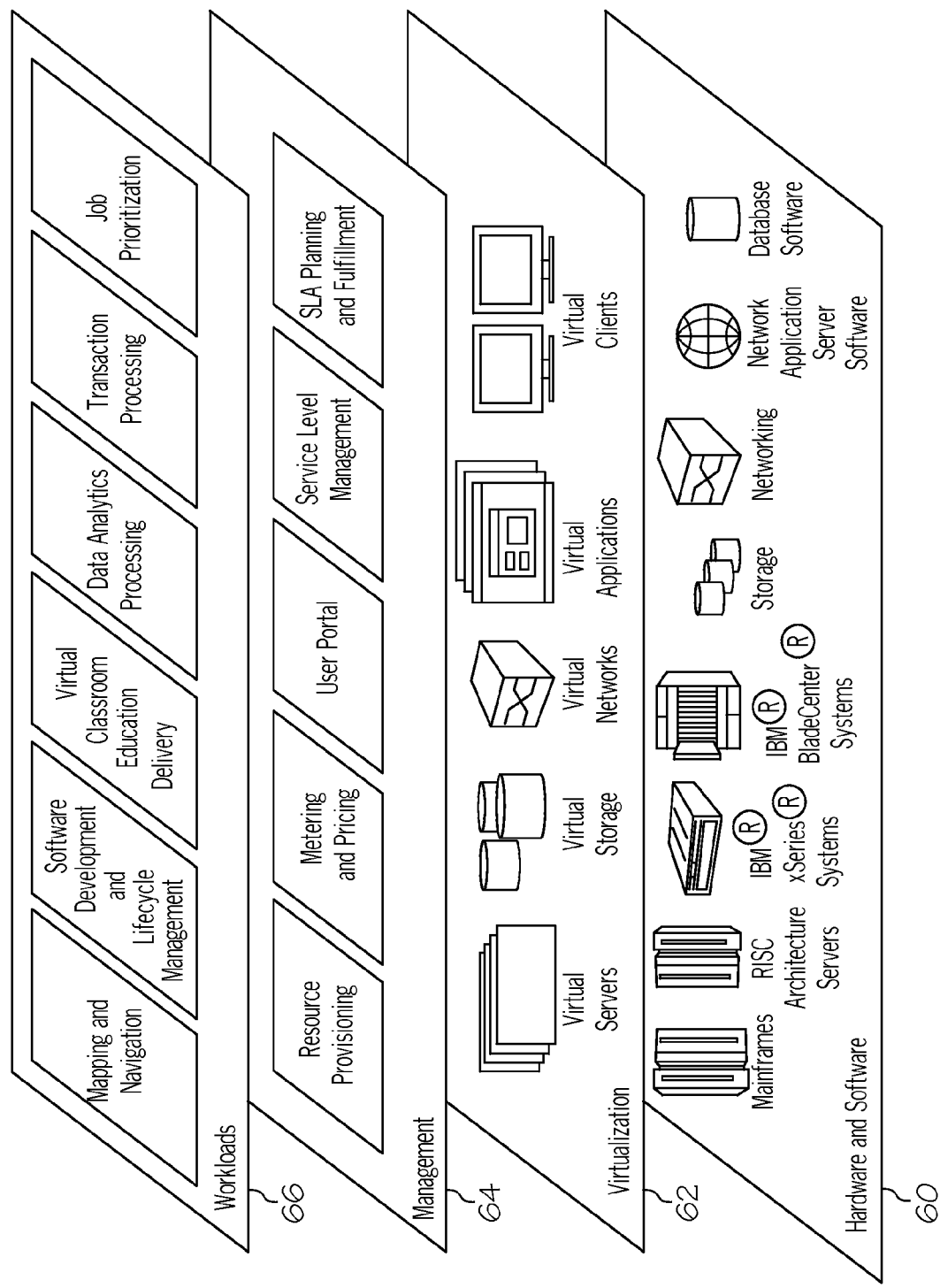
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide income tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and job prioritization. As mentioned above, all of the foregoing examples described with respect to FIG. 3 are illustrative only, and the invention is not limited to these examples.

It is understood all functions of the present invention as described herein are typically performed by the job prioritization, which can be tangibly embodied as modules of program code 42 of job priority program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

Regardless, embodiments of the present invention take into account the fact that financial penalties and/or premiums (negative or positive fiscal incentives) may be linked to the provider's ability to meet SLA terms. Specifically, the embodiments use data surrounding such penalties and/or premiums to schedule jobs in a fashion which will optimize revenue flow to the service provider. For example: Consider that the highest priority job (i.e., that with the most demanding computational requirements), may be Job1, the second highest priority job may be Job2, and so forth.

In the absence of these embodiments of the present invention, the cloud provider may simply base its scheduling strategy on the following principles: within a given slice of time, ensure that Job1 SLA's are met.
    once this is accomplished, ensure that Job2 SLA's are met.
    once this is accomplished, ensure that Job3 SLA's are met.
    once this is accomplished, ensure that Job4 SLA's are met.
    and so forth.

Such time slices may be highly granular or very coarse, but in either case, the provider is following an intuitive scheduling strategy. Additionally, each "JobX" may be considered the cumulative processes of a customer; individual processes; applications; or any other computational job (or set of computational jobs) which can be accomplished by the cloud provider and accounted for in separate fashion.

Within the context of the embodiments of the invention, however, the demands of the cumulative jobs may be more than can be met by all readily available resources for the cloud environment. It is noted that additional resources may be applied over time to solve this problem, but within a certain prescribed window, service levels will not be met. For this example, assume that four jobs exist in total, and, furthermore, that Job1's needs have hit a temporary maximum. In other words, consider the case where Job1 incurs a temporary spike, and fulfilling the requirements of Job1 may result in missed SLAs.

Depending on the specifics of Job1, the provider may see the case where:
    within a given slice of time, additional resources are provided to Job1, ensuring that Job1 SLA's are met.
    due to Job1 processing requirements, Job2 SLA's are not met.
    due to Job1 processing requirements, Job3 SLA's are not met.
    due to Job1 processing requirements, Job4 SLA's are not met.

Exacerbating the situation, the spiked requirements of Job1 may mean that prioritizing it first implies:
    even with highest possible priority, Job1 SLA's are not met.
    due to Job1 processing requirements, Job2 SLA's are not met.
    due to Job1 processing requirements, Job3 SLA's are not met.
    due to Job1 processing requirements, Job4 SLA's are not met.

Clearly, prioritizing the most important or most demanding job first may result in subsequent failures to meet service level agreements. This invention proposes the rational use of financial metrics to prioritize jobs, which may result in some jobs being "triaged" down the priority list.

Figure 4:
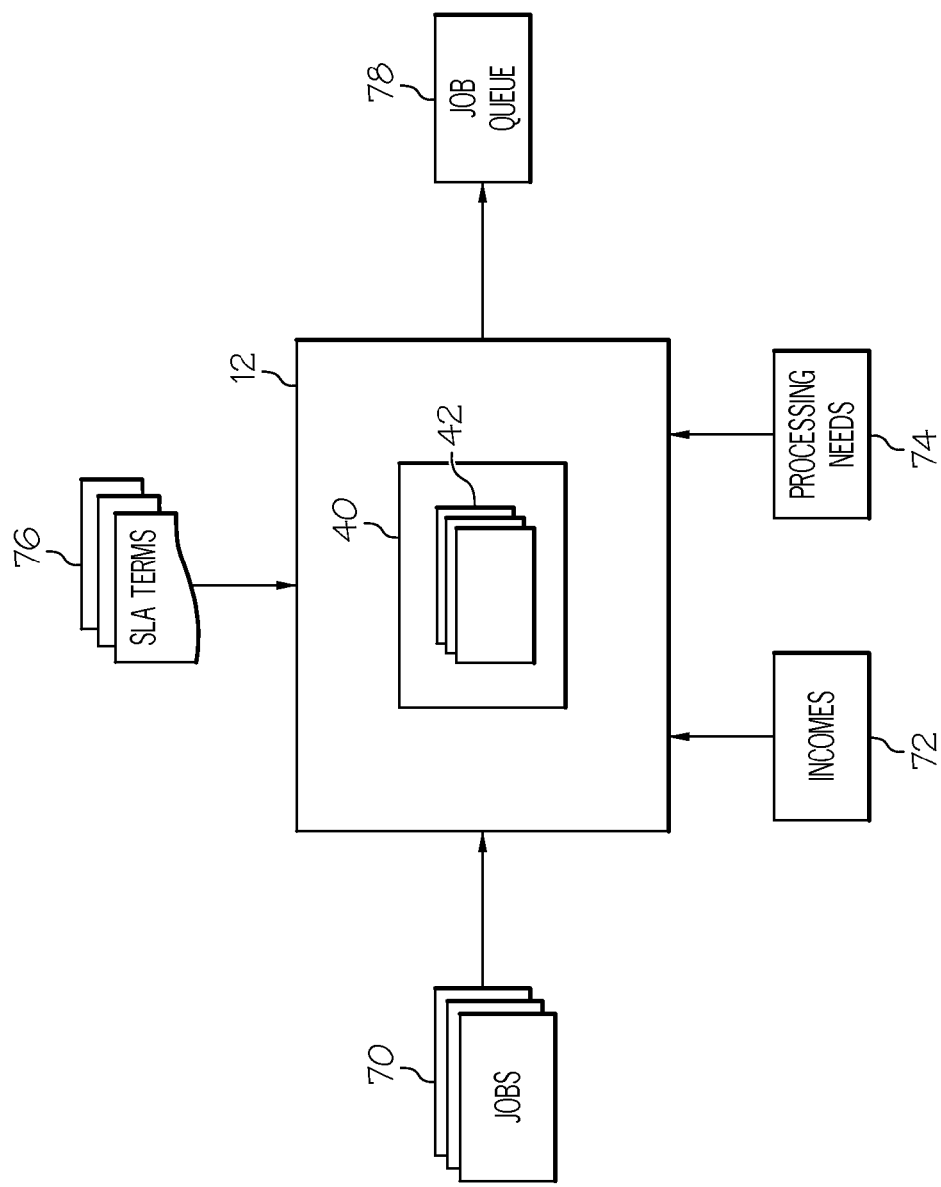
FIG. 4 depicts a component flow diagram according to an aspect of the present invention.

Referring now to FIG. 4, the embodiments of the present invention will be explained in further detail. As depicted, a computer system such as cloud node 12 having job priority program 40 is shown. Under the embodiments of the present invention, a plurality of jobs 70 will be prioritized for performance based on a set of SLA terms 76, income (i.e., profits) 72 and processing needs 74. Such considerations will be made not only on a job by job basis, but also cumulatively or collectively over the whole job package. For example, even though a job "A" may have the highest individual income/profit, performing job "A" may drain all available processing resources, leaving jobs "B-D" underperformed. This would be especially undesirable where jobs "B-D" have a higher cumulative profit margin if they were performed, or failure to perform one of jobs "B-D" would violate an SLA term. Along these lines, modules of job priority program 40 are configured to implement one or more algorithms (as described below) that consider income 72, processing needs 74, and SLA terms cumulatively so that jobs 70 can be arranged in a most appropriate fashion in job queue 78.

Based on these concepts, the following example is set forth:

Job1 Processing Needs=Job1 PN
Income of not meeting Job1 SLA=Job1 Income
Job2 Processing Needs=Job2PN
Income of not meeting Job2 SLA=Job2Income
Job3 Processing Needs=Job3PN
Income of not meeting Job3 SLA=Job3Income
Job4 Processing Needs=Job4PN
Income of not meeting Job4 SLA=Job4Income Conversely, these elements may be deemed opportunity income, where the provider is paid a premium or bonus for meeting SLAs. The same principles hold for either application of positive or negative incentives to the cloud provider. Furthermore, it may be noted that simply because Job1 has been determined to be the highest priority (e.g., the real-time video processing), it is conceivable that the income of missing lower priority jobs (e.g., a nightly batch processing) may exceed the income of not meeting Job1's SLA.

Now, the cloud provider may decide to optimize revenue flow by job assignment according to expected income impact. For example, once a spike in Job1's needs is detected, decision logic may determine whether fulfillment of Job1 will result in other SLAs to be missed. Within the context of these embodiments of the invention, if for a given time slice, the total processing capacity of the cloud environment is:

(CloudProc)<(Job1PN+Job2PN+Job3PN+Job4PN)

then reprioritization must occur. In other words, if management software or the like detects that jobs are experiencing temporary peak demands which exceed the capacity to satisfy all jobs, then reprioritization must occur. Furthermore, process reprioritization should be accomplished in the most economically efficient manner. Specifically, consider the following decision flow. At the onset (entry condition), the job with the highest income will be considered first, and the following questions/algorithm will be applied:

(a) do processing resources exist to accomplish the job with the next highest income?
(b1) if yes, then the Job with the next highest income will be prioritized next.
(b2) if no, return to (a) by considering the job with the next highest income.

It is noted that CloudProc could refer to any processing component with the overall computational equation (e.g., CPU needs, bandwidth or processing throughput, or even storage requirements for a given environment). For a practical example consider the following case, for a cloud environment with CloudProc=10.

Job1PN=2 Job1Income=5

Job2PN=5 Job2Income=3

Job3PN=1 Job3Income=1

Job4PN=4 Job4Income=4

It may be immediately seen that the overall processing needs of the jobs (12) exceed the capability of the chosen cloud environment (10). Thus, the following algorithm is applied:

(a) do processing resources exist to accomplish Job1? (The highest income job.)
(b1) if yes, then the Job with the next highest income will be prioritized next. (Schedule Job1 first, leaving remaining CloudProc of 8.)
(b2) if no, return to (a) by considering the job with the next highest income.
(c) do processing resources exist to accomplish Job4? (The "next highest" income job.)
(d1) if yes, then the Job with the next highest income will be prioritized next. (Schedule Job4 next, leaving remaining CloudProc of 4.)
(d2) if no, return to (a) by considering the job with the next highest income.
(e) do processing resources exist to accomplish Job2? (The "next highest" income. No, because CloudProc of "4" remains whereas Job2 needs "5")
(f1) if yes, then the Job with the next highest income will be prioritized next.
(f2) if no, return to (a) by considering the job with the next highest income. (Move on to test next job.)
(g) do processing resources exist to accomplish Job3? (The "next highest" income. Yes.)
(h1) if yes, then the Job with the next highest income will be prioritized next. (Schedule Job3 next, leaving remaining CloudProc of 3.)
(h2) if no, return to (a) by considering the job with the next highest income. (Return.)

Once all jobs that can be readily accommodated have been scheduled, a variety of techniques may be used to schedule the "overage" jobs. One approach is to then use a similar algorithm and schedule the job with the highest income next, even if it is presumed to fail (e.g., to meet the SLA). Presuming that each job executes as expected, it may be noted that the overall income incurred by the cloud provider by using this algorithm is then "3." Alternatively, the job with the lowest expected processing needs may be scheduled, in the hopes that the estimate was off and the job might be successfully accomplished (e.g., the SLA was met). In the absence of this algorithm, an original prioritization would have resulted in assignment of jobs 1, 2, and 3, thus leaving Job4 to fail (e.g., to meet the SLA). In this case, the income incurred would have been "4." With the application of this enhancement, the income incurred would have been "3," thus signifying the fiscal improvement.

Another approach takes on a slightly different method to accomplish similar objectives. The algorithm described above takes the highest income job first, evaluates it, and then moves to the next job. The other method is to take the total resource (CloudProc=10) and then apply an optimal best fit algorithm. With the following (slightly modified in dark red) processing needs, consider an alternative approach:

Job1PN=7 Job1Income=5

Job2PN=5 Job2Income=3

Job3PN=1 Job3Income=1

Job4PN=4 Job4Income=4 the former method would allocate Job1, then fail for Jobs 2, 3 and 4 with a total income of 8 (3+1+4) "penalty points." However, an optimal "best fit" algorithm may be applied:

Job1PN=7 Job1Income=5

Job2PN=5 Job2Income=3

Job3PN=1 Job3Income=1

Job4PN=4 Job4Income=4

Then it may be seen that fulfilling Jobs 2, 3, and 4 (with processing needs of 5, 1, and 4 respectively) produces a penalty income of only 5 points. Again, by application of either variant for this invention, cloud service providers can improve financial performance, whether their SLAs are stated in terms of bonuses for met service levels, or stated in terms of financial penalties for missed service levels.

Figure 5:
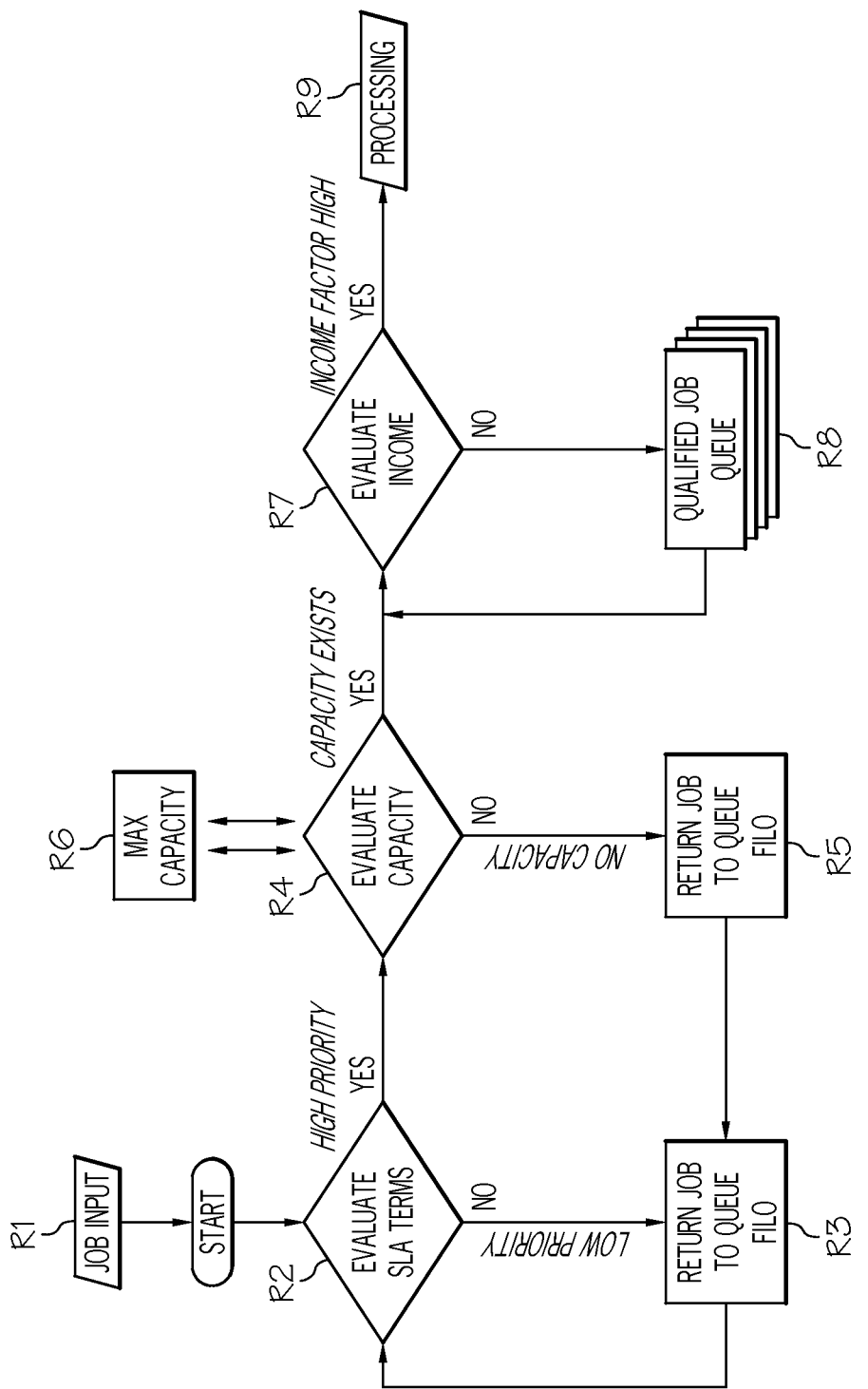
FIG. 5 depicts a method flow diagram according to an aspect of the present invention.

These concepts will be further described in conjunction with the flow diagram of FIG. 5. In step R1, job input (e.g., job descriptions, requirements, etc. are received. For each job, the following analysis is performed: In step R2, SLA terms are evaluated to determine a priority of each job. If a job is found to have a lower priority, it is returned to the job queue in step R3 (e.g., a First In last Out (FILO) queue). However, if a job is determined to have a higher priority (or short time constraint, or some other SLA term dictating its immediate or near immediate performance), the process continues to step R4 where it is determined whether the system has a processing capacity that can accommodate the processing needs of the job. Specifically, it will be determined if the processing needs of the job will exceed the maximum capacity R6 of the system. If sufficient capacity does not exist, the job is returned to the job queue in step R5. However, if sufficient capacity does exist, the process continues to step R7 where the respective income of each job will be evaluated. In this evaluation, it will be determined which jobs (or order of jobs) will yield the highest profit. Along these lines, if a job does not have a high income factor, it can be placed into a qualified job queue in step R8. If the job will produce a high income factor, it can be processed/performed in step R9.

Figure 6:
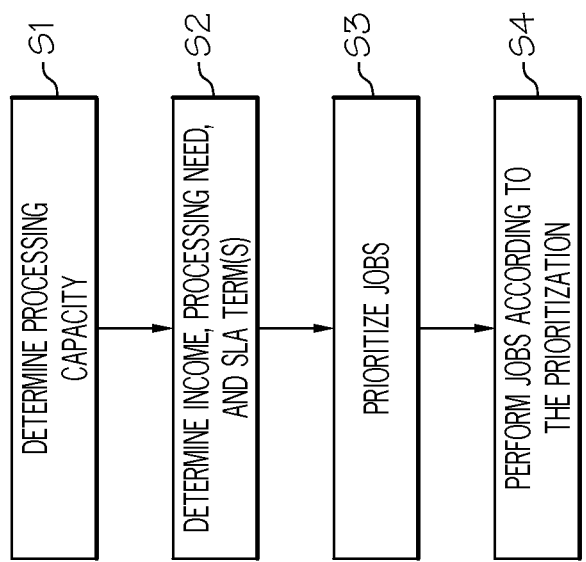
FIG. 6 depicts another method flow diagram according to an aspect of the present invention.

Referring now to FIG. 6, another method flow diagram according to another embodiment of the present invention is shown. In step S1, a processing capacity of a cloud computing environment is determined. In step S2, an income, a processing need and a set of service level agreement (SLA) terms (e.g., a predetermined priority, a time constraint, etc.) for each of a plurality of jobs is determined. In step S3, the plurality of jobs is prioritized based on their respective income, processing need, and SLA terms. As mentioned above, the prioritizing ensures that the set of SLA terms are met while maximizing the income and without exceeding the processing capacity. Along these lines, the prioritization can position one of the plurality of jobs having a higher income in a higher position in a job queue than another one of the plurality of jobs having a lower income. Alternatively, the prioritization can comprise determining a highest total income of a subset of the plurality of jobs that can be performed without exceeding the processing capacity. Regardless, in step S4, the plurality of jobs is performed based on the prioritization.

While shown and described herein as a job priority solution, it is understood that the invention further provides various alternative embodiments. For example, in one embodiment, the invention provides a computer-readable/useable medium that includes computer program code to enable a computer infrastructure to provide job priority functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide job priority functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for job priority. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for prioritizing jobs within a cloud computing environment, comprising:
   determining, using at least one computing device, a processing capacity of the cloud computing environment;
   determining, using the at least one computing device, an income, a processing need, a set of service level agreement (SLA) terms for each of a plurality of jobs;
   prioritizing, using the at least one computing device, a set of jobs from the plurality of jobs based on their respective income, processing need, and SLA terms, wherein the prioritizing ensures that the set of SLA terms are met while maximizing the income and without exceeding the determined processing capacity;
   scheduling, using the at least one computing device, the prioritized set of jobs from the plurality of jobs; and
   scheduling, using the at least one computing device, at least one job having lowest expected processing needs of the plurality of jobs other than the prioritized set of jobs.

2. The method of claim 1, the set of SLA terms comprising a predetermined priority for at least one of the plurality of jobs.

3. The method of claim 1, the set of SLA terms comprising a time constraint for performing at least one of the plurality of jobs.

4. The method of claim 1, the prioritizing comprising positioning, using the at least one computing device, one of the plurality of jobs having a higher income in a higher position in a job queue than another one of the plurality of jobs having a lower income.

5. The method of claim 1, the prioritizing comprising determining, using the at least one computing device, a highest total income of a subset of the plurality of jobs that can be performed without exceeding the determined processing capacity.

6. The method of claim 1, further comprising performing, using the at least one computing device, the prioritized set of jobs from the plurality of jobs based on the prioritizing; and performing, using the at least one computing device, the at least one job if actual processing capacity exists in an amount sufficient to process the at least one job.

7. A system for prioritizing jobs within a cloud computing environment, comprising:
   a bus;
   a processor coupled to the bus; and
   a memory medium coupled to the bus, the memory medium comprising instructions to:
      determine a processing capacity of the cloud computing environment;
      determine an income, a processing need, a set of service level agreement (SLA) terms for each of a plurality of jobs;
      prioritize the plurality of jobs based on their respective income, processing need, and SLA terms, wherein the prioritizing ensures that the set of SLA terms are met while maximizing the income and without exceeding the determined processing capacity;
      schedule the prioritized set of jobs from the plurality of jobs; and
      schedule at least one job presumed to fail based on the determined processing capacity, the at least one job being from the plurality of jobs other than the prioritized set of jobs.

8. The system of claim 7, the set of SLA terms comprising a predetermined priority for at least one of the plurality of jobs.

9. The system of claim 7, the set of SLA terms comprising a time constraint for performing at least one of the plurality of jobs.

10. The system of claim 7, the memory medium further comprising instructions to position one of the plurality of jobs having a higher income in a in a higher position in a job queue than another one of the plurality of jobs having a lower income.

11. The system of claim 7, the memory medium further comprising instructions to determine a highest total income of a subset of the plurality of jobs that can be performed without exceeding the determined processing capacity.

12. The system of claim 7, the memory medium further comprising instructions to perform the prioritized set of the plurality of jobs based on the prioritization; and perform the at least one job presumed to fail if actual processing capacity exists to complete the at least one job.

13. A computer program product for prioritizing jobs within a cloud computing environment, the computer program product comprising a computer readable storage medium, and program instructions stored on the computer readable storage medium, to:
   determine a processing capacity of the cloud computing environment;
   determine an income, a processing need, a set of service level agreement (SLA) terms for each of a plurality of jobs;
   prioritize the plurality of jobs based on their respective income, processing need, and SLA terms, wherein the prioritizing ensures that the set of SLA terms are met while maximizing the income and without exceeding the determined processing capacity;
   schedule the prioritized set of jobs from the plurality of jobs;
   schedule at least one job having a highest income of the plurality of jobs other than the prioritized set of jobs.

14. The computer program product of claim 13, the set of SLA terms comprising a predetermined priority for at least one of the plurality of jobs.

15. The computer program product of claim 13, the set of SLA terms comprising a time constraint for performing at least one of the plurality of jobs.

16. The computer program product of claim 13, further comprising program instructions stored on the computer readable storage medium to position one of the plurality of jobs having a higher income in a higher position in a job queue than another one of the plurality of jobs having a lower income.

17. The computer program product of claim 13, further comprising program instructions stored on the computer readable storage medium to determine a highest total income of a subset of the plurality of jobs that can be performed without exceeding the determined processing capacity.

18. The computer program product of claim 13, further comprising program instructions stored on the computer readable storage medium to perform the prioritized set of jobs from the plurality of jobs based on the prioritization; and perform at least a portion of the at least one job if enough actual processing capacity exists to complete the at least a portion of the at least one job.

19. A method for deploying a system for prioritizing jobs within a cloud computing environment, comprising:

determining, via a computer infrastructure, a processing capacity of the cloud computing environment;

determining, via the computer infrastructure, an income, a processing need, a set of service level agreement (SLA) terms for each of a plurality of jobs;

prioritizing, via the computer infrastructure, the plurality of jobs based on their respective income, processing need, and SLA terms, wherein the prioritizing ensures that the set of SLA terms are met while maximizing the income and without exceeding the processing capacity;

performing, via the computer infrastructure, the prioritized set of jobs from the plurality of jobs; and performing, via the computer infrastructure, a portion of at least one job other than the prioritized set of jobs if enough actual processing capacity exists to complete the portion of the at least one job, wherein the computer infrastructure comprises at least one computer.

20. The method of claim 19, wherein the performing, via the computer infrastructure, the prioritized set of jobs is based on the prioritizing.

* * * * *